United States Patent
Tsuji et al.

(10) Patent No.: US 10,193,693 B2
(45) Date of Patent: Jan. 29, 2019

(54) INFORMATION PROCESSING DEVICE AND VERSION SWITCHING METHOD OF TRUSTED PLATFORM MODULE

(71) Applicant: Kabushiki Kaisha Toshiba, Minato-ku, Tokyo (JP)

(72) Inventors: Tadashi Tsuji, Tokyo (JP); Toshimitsu Saito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 100 days.

(21) Appl. No.: 15/363,814

(22) Filed: Nov. 29, 2016

(65) Prior Publication Data
US 2017/0085384 A1 Mar. 23, 2017

Related U.S. Application Data

(63) Continuation of application No. PCT/JP2014/064458, filed on May 30, 2014.

(51) Int. Cl.
*G06F 9/44* (2018.01)
*H04L 9/32* (2006.01)
*G06F 9/4401* (2018.01)
*G06F 12/02* (2006.01)

(52) U.S. Cl.
CPC ............ *H04L 9/3234* (2013.01); *G06F 9/441* (2013.01); *G06F 12/0246* (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505
See application file for complete search history.

(56) References Cited

U.S. PATENT DOCUMENTS

| 7,568,225 | B2 | 7/2009 | Wang et al. |
| 8,959,363 | B2 | 2/2015 | Saripalli |
| 9,122,893 | B1* | 9/2015 | Dasari ..................... G06F 21/57 |
| 2003/0014622 | A1* | 1/2003 | Larvoire ................. G06F 9/441 |
| | | | 713/2 |
| 2009/0228868 | A1 | 9/2009 | Drukman et al. |

(Continued)

FOREIGN PATENT DOCUMENTS

| JP | 2002-250130 A | 9/2002 |
| JP | 2002-259130 A | 9/2002 |

(Continued)

OTHER PUBLICATIONS

International Search Report issued by Japan Patent Office dated Sep. 9, 2014 in the corresponding PCT Application No. PCT/JP2014/064458—3 pages.

*Primary Examiner* — Zahid Choudhury
(74) *Attorney, Agent, or Firm* — Knobbe, Martens, Olson & Bear, LLP

(57) ABSTRACT

According to one embodiment, a system program determines whether a boot mode of an information processing device is set to a first mode for booting an operating system from a storage device initialized by a master boot record (MBR) or a second mode for booting an operating system from a storage device initialized by a GUID partition table (GPT). The system program enables a first or second trusted platform module based on a result of determination of the boot mode.

7 Claims, 4 Drawing Sheets

(56) References Cited

U.S. PATENT DOCUMENTS

| | | | |
|---|---|---|---|
| 2013/0103934 A1 | 4/2013 | Hashioka et al. | |
| 2014/0237220 A1* | 8/2014 | O'Rourke | G06F 9/4401 713/1 |
| 2014/0304520 A1* | 10/2014 | Bobzin | G06F 21/572 713/187 |
| 2017/0249464 A1* | 8/2017 | Maximov | G06F 21/57 |

FOREIGN PATENT DOCUMENTS

| | | |
|---|---|---|
| JP | 2006-079617 A | 3/2006 |
| JP | 2011-258199 A | 12/2011 |
| JP | 2013-089148 A | 5/2013 |

* cited by examiner

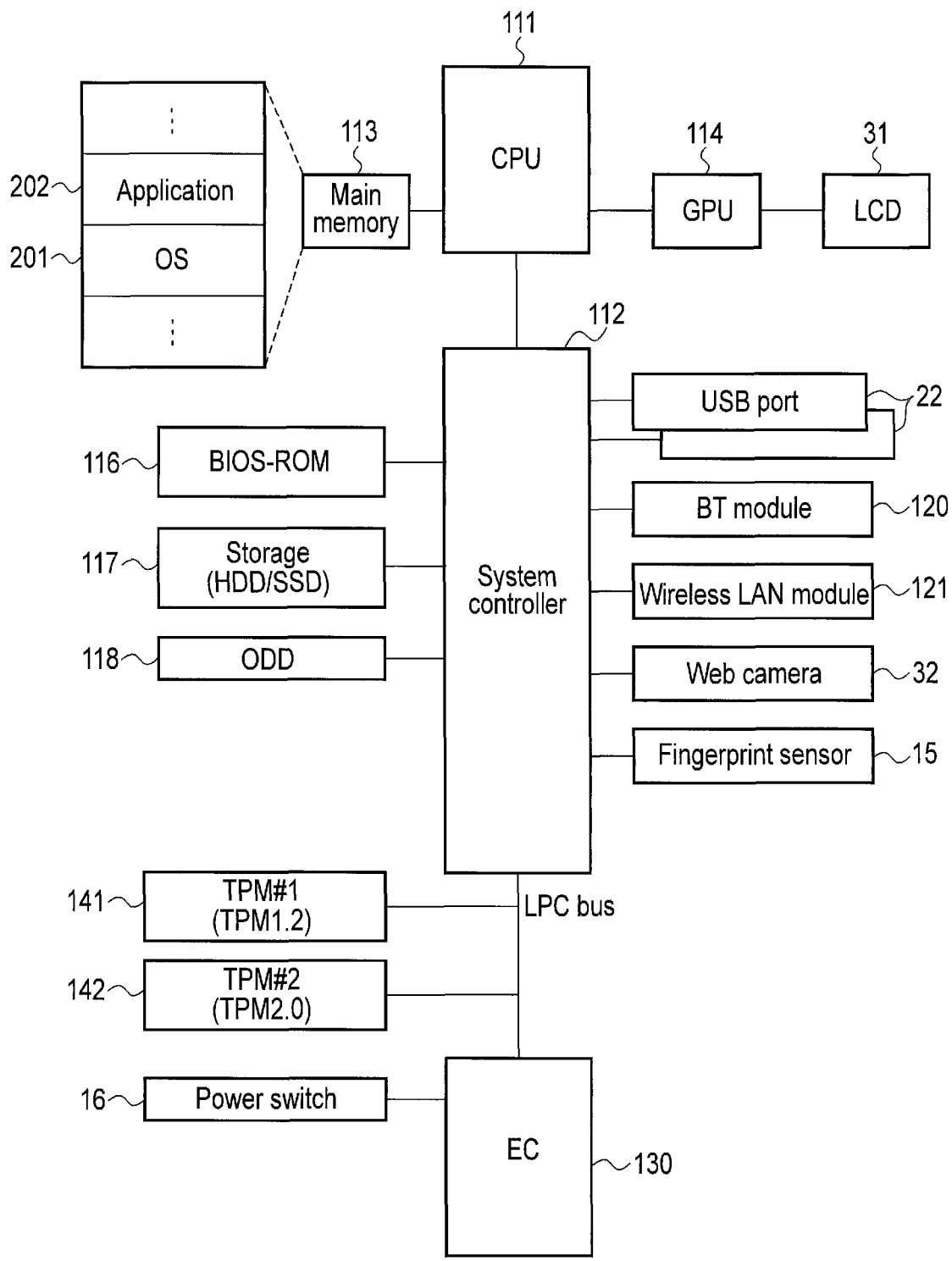
F I G. 2

INFORMATION PROCESSING DEVICE AND VERSION SWITCHING METHOD OF TRUSTED PLATFORM MODULE

CROSS REFERENCE TO RELATED APPLICATIONS

This application is a Continuation Application of PCT Application No. PCT/JP2014/064458, filed May 30, 2014, the entire contents of which are incorporated herein by reference.

FIELD

Embodiments described herein relate generally to a technology for using a trusted platform module (TPM).

BACKGROUND

In recent years, various types of information processing devices, such as a personal computer and a tablet computer, have been developed. These devices are required to realize a security function to protect them against malware, etc.

For example, a trusted platform module (TPM) configured to perform a function to realize trusted computing has been mounted in the recent information processing devices.

A new version of TPM has been also developed in comparison with the conventional TPM. The new version of TPM is useful for realizing a higher security level.

However, in the present circumstances, operating systems which can access the new version of TPM are limited to certain types of operating systems. Thus, the new version of TPM cannot be used depending on the operation environment of the information processing device.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block diagram showing the system configuration of the information processing device of the embodiment.

DETAILED DESCRIPTION

Various embodiments will be described hereinafter with reference to the accompanying drawings.

In general, according to one embodiment, an information processing device includes a hardware processor, a nonvolatile memory, a first trusted platform module, and a second trusted platform module which is a version newer than the first trusted platform module. The nonvolatile memory is configured to store a system program. The system program causes the hardware processor to perform a function of determining whether a boot mode of the information processing device is set to a first mode or a second mode based on a setting value indicative of the boot mode. The first mode is a mode for booting an operating system from a storage device initialized by a master boot record (MBR). The second mode is a mode for booting an operating system from a storage device initialized by a GUID partition table (GPT). The system program causes the hardware processor to further perform a function of enabling the first or second trusted platform module based on a result of determination of the boot mode such that the first trusted platform module is enabled when the boot mode is the first mode, and the second trusted platform module is enabled when the boot mode is the second mode.

Figure 1:
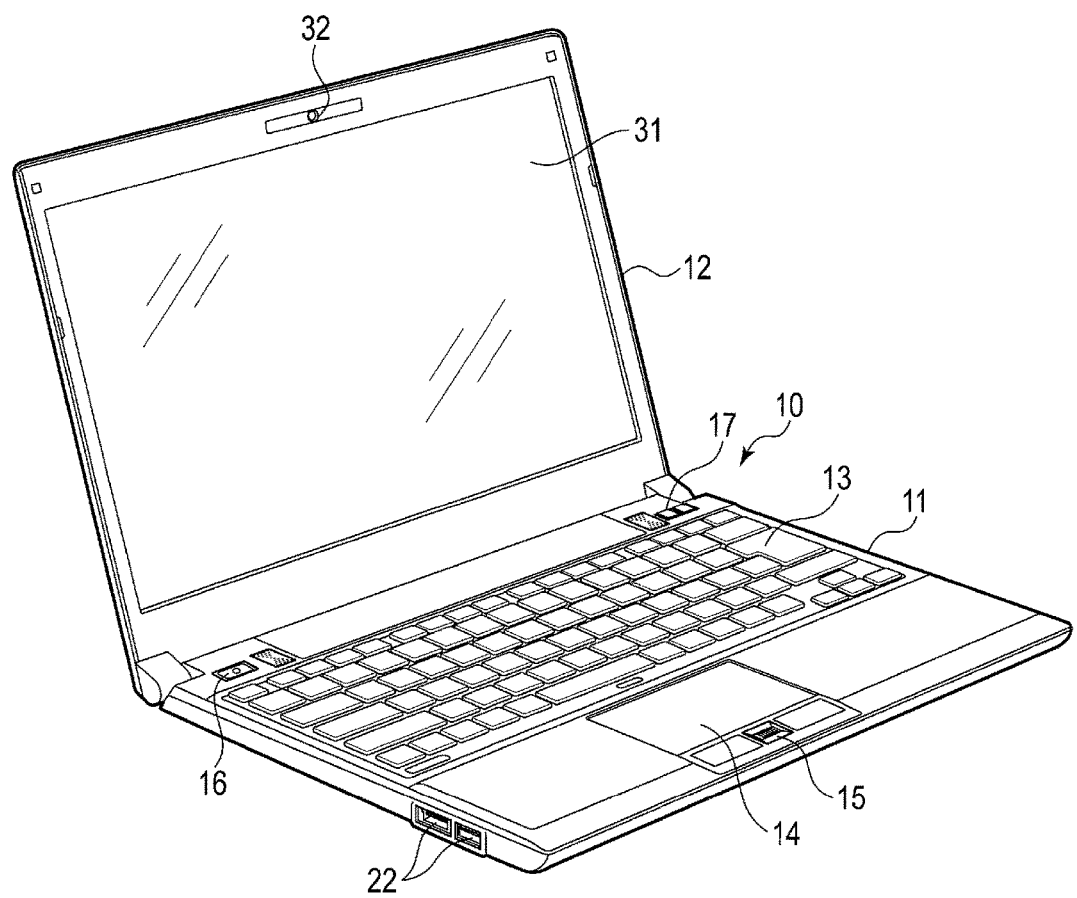
FIG. 1 is an exemplary perspective illustration showing the external appearance of an information processing device according to an embodiment.

FIG. 1 is a perspective illustration showing the external appearance of an information processing device according to an embodiment. The information processing device may be realized as, for example, a desktop personal computer, a notebook personal computer, a tablet computer or various other types of information processing devices. In the following explanation, it is assumed that the information processing device is realized as a notebook personal computer 10.

FIG. 1 is a perspective illustration in which the computer 10 with an opened display unit is viewed from the front side. The computer 10 includes a computer main unit 11 and a display unit 12. A display device such as a liquid crystal display (LCD) 31 is incorporated into the display unit 12. Further, a camera (web camera) 32 is provided in the upper end portion of the display unit 12.

The display unit 12 is attached to the computer main unit 11 such that the display unit 12 is rotatable between an open position where the upper surface of the main unit 11 is exposed and a closed position where the upper surface of the computer main unit 11 is covered by the display unit 12. The computer main unit 11 has a thin box-shaped housing. For example, a keyboard 13, a touchpad 14, a fingerprint sensor 15, a power switch 16 for turning the computer 10 on or off, and some feature buttons 17 are provided on the upper surface of the housing. Moreover, some USB ports 22 are provided in the computer main unit 11.

FIG. 2 shows a system configuration of the computer 10. The computer 10 includes a CPU 111, a system controller 112, a main memory 113, a graphics processing unit (GPU) 114, a BIOS-ROM 116, a storage device (a hard disk drive [HDD] or a solid state drive [SSD]) 117, an optical disk drive (ODD) 118, a Bluetooth [registered trademark] (BT) module 120, a wireless LAN module 121, an embedded controller (EC) 130, and two types of trusted platform modules (TPMs) 141 and 142.

The CPU 111 is a hardware processor configured to execute various programs loaded from the storage device 117 into the main memory 113. The examples of the programs include an operating system (OS) 201 and various application programs.

The CPU 111 also executes a basic input/output system (BIOS) stored in the BIOS-ROM 116, which is a nonvolatile memory. The BIOS is a system program for hardware control. This system program (BIOS) includes instructions for performing an interface between the operating system (OS) 201 and hardware. The BIOS is implemented as a unified extensible firmware interface (UEFI) BIOS, which has both instructions of a legacy BIOS and instructions of a UEFI.

The trusted platform module (TPM) 141 is configured to perform various security functions defined in a TPM specification (for example, the TPM version 1.2). The trusted platform module (TPM) 142 is configured to perform various security functions defined in a new TPM version (for example, the TPM version 2.0) in comparison with the trusted platform module (TPM) 141. Functions are added to TPM version 2.0 to realize a higher security level than TPM version 1.2.

Each of the trusted platform modules (TPMs) 141 and 142 may be a security chip (hardware TPM) which is a hardware device.

Alternatively, each of TPMs 141 and 142 may be a software TPM implemented by software running on a processor. The examples of technology for implementing a software TPM include Intel (registered trademark) Platform Trust Technology.

The computer 10 supports both of the two old and new versions of TPM (TPM 1.2 and TPM 2.0). Thus, not only for a first type operating system which supports TPM 2.0 and has a system requirement of TPM 2.0 but also for a different type operating system which supports only TPM 1.2 and cannot use TPM 2.0, the computer 10 can provide a system environment having security functions.

An example of the different type operating system includes, for example, Windows 7 (registered trademark). An example of the first type operating system includes, for example, Windows 8 (registered trademark) or later, such as Windows 8 and Windows 8.1 (registered trademark).

Windows 8/8.1 is an operating system which requires TPM 2.0, and is configured to perform security functions based on TPM 2.0. Windows 8/8.1 includes a device driver for accessing TPM 2.0, and is allowed to use TPM 2.0 via the device driver.

Thus, Windows 8/8.1 is allowed to perform functions with higher security, by using, for example, a unified extensible firmware interface (UEFI) and the security functions of TPM 2.0.

To the contrary, Windows 7 does not include a device driver for accessing TPM 2.0. Thus, Windows 7 is not allowed to use TPM 2.0.

To implement both TPM 1.2 and TPM 2.0 on the computer 10, the following methods may be used.
  (1) Both TPM 1.2 and TPM 2.0 are implemented by hardware TPMs (hardware devices).
  (2) TPM 1.2 is implemented by a hardware TPM, and TPM 2.0 is implemented by a software TPM.
  (3) TPM 1.2 is implemented by a software TPM, and TPM 2.0 is implemented by a hardware TPM.
  (4) Both TPM 1.2 and TPM 2.0 are implemented by software TPMs.

Alternatively, both TPM 1.2 and TPM 2.0 may be implemented by one hardware device. In this case, a firmware to be executed by the hardware device, in other words, the firmware stored in the nonvolatile memory of the hardware device, may be switched between first firmware for performing functions corresponding to TPM 1.2 and second firmware for performing functions corresponding to TPM 2.0. For example, the BIOS may include instructions for rewriting the first firmware stored in the nonvolatile memory of the hardware device with the second firmware. By using the instructions, TPM 2.0 can be enabled. Alternatively, the BIOS may include instructions for rewriting the second firmware stored in the nonvolatile memory of the hardware device with the first firmware. By using the instructions, TPM 1.2 can be enabled. The first firmware and the second firmware may be stored in the BIOS-ROM 116. The BIOS may include instructions for writing the first firmware stored in the BIOS-ROM 116 to the nonvolatile memory of the hardware device when the hardware device operates as TPM 1.2. The BIOS may include instructions for writing the second firmware stored in the BIOS-ROM 116 to the nonvolatile memory of the hardware device when the hardware device operates as TPM 2.0.

Alternatively, both the first firmware and the second firmware may be stored in the nonvolatile memory of the hardware device in advance. In this case, the BIOS includes instructions for specifying a firmware to be executed by the hardware device. By using the instructions, the hardware device can function as TPM 1.2 or TPM 2.0.

The BIOS supports two types of boot modes (a first mode and a second mode) to boot an operating system.

The first mode is a boot mode for booting an operating system from a storage device initialized by a master boot record (MBR). The first mode is called compatibility support module (CSM) boot or legacy boot.

The second mode is a boot mode for booting an operating system from a storage device initialized by a globally unique identifier (GUID) partition table (GPT). The second mode is called UEFI boot. Various UEFI functions are available by using UEFI boot. The examples of the UEFI functions include secure boot. A boot process with high security can be performed by using the secure boot of UEFI.

The boot mode to be used on the computer 10, specifically, the first mode (CSM boot) or the second mode (UEFI boot), may be specified by using a setup screen provided by the BIOS (UEFI BIOS).

In general, in many cases, CSM boot is used in the operation environment using Windows 7, and UEFI boot is used in the operation environment using Windows 8/8.1.

Normally, Windows 7 is installed into the storage device 117, using CSM boot. In this case, the storage device 117 is initialized by a master boot record (MBR) in the process for installing Windows 7. The master boot record (MBR) includes a bootloader and a partition table. The partition table indicates the position of each partition in the storage device 117. The partition table includes a boot flag indicating a partition to be booted (an active partition). Windows 7 is installed into a partition managed by the master boot record (MBR). Thus, normally, the boot mode in the computer environment using Windows 7 is CSM boot.

For example, if the computer 10 is shipped from the factory in a state where Windows 7 is preinstalled, the default boot mode of the computer 10 may be CSM boot. The computer 10 may be shipped from the factory in a state where the boot mode is set to CSM boot.

Windows 8/8.1 requires functions of UEFI such as secure boot. Thus, when Windows 8/8.1 is used as the OS 201, normally, the OS 201 is installed into the storage device 117, using UEFI boot. In this case, the storage device 117 is initialized by the GPT in the process for installing Windows 8/8.1. A plurality of GPT entries are set in the storage device 117 initialized by the GPT. Each GPT entry indicates the head position and the end position of a corresponding partition. For example, a UEFI system partition for storing a UEFI OS loader, etc., and an OS partition for storing the operating system are created in the storage device 117. Windows 8/8.1 is installed into the OS partition. Thus, normally, the boot mode in the operation environment using Windows 8/8.1 is UEFI boot.

For example, if the computer 10 is shipped from the factory in a state where Windows 8/8.1 is preinstalled, the default boot mode of the computer 10 may be UEFI boot. The computer 10 may be shipped from the factory in a state where the boot mode is set to UEFI boot.

The BIOS further includes instructions for manually setting (changing) the TPM version to be used. The TPM version to be used may be manually set by using the setup screen provided by the BIOS.

However, there is a possibility that the manual setting using the setup screen of the BIOS may force the user to be acquainted with the BIOS setup and perform troublesome operations for the setup (change).

In the present embodiment, the BIOS also includes instructions for automatically switching the TPM version. By using the instructions, the TPM version to be used is automatically switched in accordance with the current operation environment of the computer 10.

In the present embodiment, the TPM version to be used can be switched by using at least one of the following conditions for automatic switching.

(1) Boot mode
(2) OS type
(3) Presence or absence of a hardware TPM

First, this specification explains a case where the boot mode is used as a condition for automatic switching.

As described above, in general, CSM boot is used in the operation environment using the above different type OS (for example, Windows 7). UEFI boot is used in the operation environment using the first type OS (for example, Windows 8/8.1). With this configuration, the BIOS includes instructions for automatically switching the TPM version to be used in accordance with the boot mode (CSM boot/UEFI boot). More specifically, when the computer 10 is turned on, the BIOS includes instructions for determining whether the boot mode is set to CSM boot or UEFI boot based on the setting value indicating the boot mode in the BIOS setup. The BIOS further includes instructions for enabling TPM 1.2 (a first trusted platform module) or TPM 2.0 (a second trusted platform module) based on the result of determination of the boot mode.

The BIOS includes instructions for enabling TPM 1.2 (the first trusted platform module) when the boot mode is set to CSM boot. The BIOS includes instructions for enabling TPM 2.0 (the second trusted platform module) when the boot mode is UEFI boot.

By using these instructions, TPM 1.2 can automatically operate when Windows 7 is booted, and TPM 2.0 can automatically operate when Windows 8/8.1 is booted.

Now, this specification explains a case where the OS type is used as a condition for automatic switching.

The BIOS includes instructions for obtaining, after the operating system is booted, information related to the operating system (the version information of the operating system) from the operating system, and instructions for saving the obtained OS information in the BIOS-ROM 116. Thus, when OS information is present in the BIOS-ROM 116, at the time of turning the computer 10 on, the type of operating system, which is previously booted, can be recognized based on the OS information stored in the BIOS-ROM 116, in other words, based on information related to the operating system which is previously booted. In general, in many cases, the type of operating system to be booted this time is the same as the type of operating system which is previously booted. With this configuration, the TPM version to be used can be automatically switched in accordance with the type of operating system which is previously booted.

More specifically, the BIOS includes instructions for determining whether the operating system which is previously booted is the first type operating system supporting TPM 2.0 when the computer 10 is turned on. The BIOS further includes instructions for enabling TPM 1.2 (the first trusted platform module) or TPM 2.0 (the second trusted platform module) based on the result of determination of the type of operating system which is previously booted.

When the operating system which is previously booted is not the first type operating system, in other words, when the operating system which is previously booted is the above different type operating system which does not support TPM 2.0, TPM 1.2 (the first trusted platform module) is enabled by using the instructions in the BIOS. When the operating system which is previously booted is the first type operating system, TPM 2.0 (the second trusted platform module) is enabled by using the instructions in the BIOS.

In this manner, in environment where OS information is present, TPM 1.2 or TPM 2.0 is automatically enabled in accordance with the operating system which is previously booted.

Now, this specification explains a case where the presence or absence of a hardware TPM is used as a condition for automatic switching.

A method of using the presence or absence of a hardware TPM as a condition for automatic switching is suitable for, for example, a system configuration in which TPM 1.2 is implemented by a hardware TPM, and further, TPM 2.0 is implemented by a software TPM. When Windows 7 is preinstalled into the computer 10, the computer 10 may be shipped from the factory in a state where the hardware TPM of TPM 1.2 is mounted. When Windows 8/8.1 is preinstalled into the computer 10, in order to reduce the cost, the computer 10 may be shipped from the factory in a state where the hardware TPM of TPM 1.2 is not mounted. With this configuration, the TPM version to be used can be automatically switched in accordance with the presence or absence of a hardware TPM.

More specifically, the BIOS includes instructions for determining whether or not a hardware TPM (a first hardware device for realizing TPM 1.2) is present when the computer 10 is turned on. The BIOS further includes instructions for enabling TPM 1.2 (a hardware TPM) or TPM 2.0 (a software TPM) based on the result of determination indicating whether or not a hardware TPM is present.

When a hardware TPM is present, TPM 1.2 (a hardware TPM) is enabled by using the instructions in the BIOS. When a hardware TPM is not present, TPM 2.0 (a software TPM) is enabled by using the instructions in the BIOS.

In this manner, it is possible to cause TPM 1.2 to automatically operate in a system configuration where a hardware TPM is present (a system configuration where Windows 7 is preinstalled), and cause TPM 2.0 to automatically operate in a system configuration where a hardware TPM is not present (a system configuration where Windows 8/8.1 is preinstalled).

Even if the operating system used in the computer 10 is changed by the user after the computer 10 is shipped from the factory, from the three conditions for automatic switching, specifically, the boot mode, the OS type and the presence or absence of a hardware TPM, the boot mode and the OS type are used to deal with the change.

A method of using the boot mode as a condition for automatic switching allows a TPM version suitable for the operation environment of the computer 10 to operate even when the computer 10 is booted at the first time.

When OS information is already present, there is a possibility that a method of using the OS type as a condition for automatic switching is allowed to select a TPM version suitable for the operation environment of the computer 10 more accurately than a method of using the boot mode as a condition for automatic switching because Windows 7 may be booted by using UEFI boot in some cases.

In the present embodiment, TPM version can be automatically switched by using a combination of one or more conditions selected from the above three conditions for automatic switching.

Figure 3:
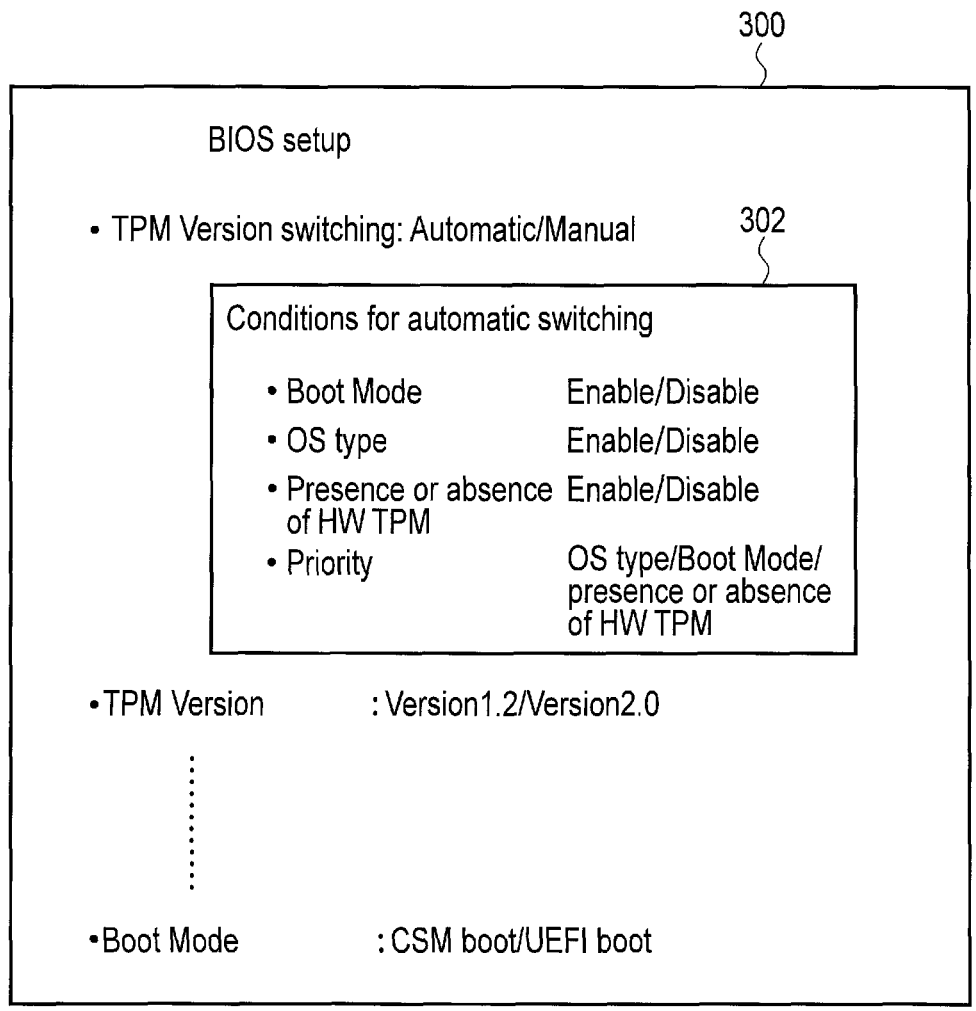
FIG. 3 is an exemplary view showing some setting items settable or changeable by a BIOS setup of the information processing device of the embodiment.

FIG. 3 shows some setting items settable or changeable by the BIOS setup.

In a setup screen 300 displayed by using the BIOS, setting items such as "TPM Version Switching", "TPM Version" and "Boot Mode" are displayed.

The setting item "TPM Version Switching" is a setting item for enabling or disabling the function of automatically switching the TPM version to be used. The user can set "TPM Version Switching" to "Enable (automatic)" or "Disable (manual)" by operating the keyboard. When the user selects "Enable (automatic)", the TPM version to be used is automatically switched. When the user selects "Disable (manual)", the TPM version to be used must be manually switched.

When the user selects "Enable (automatic)", a screen 302 for allowing the user to set or change the conditions for automatic switching may be popped up on the setup screen 300. The user can enable at least one of the boot mode, the OS type and the presence or absence of a hardware TPM as conditions for automatic switching.

When two or more conditions for automatic switching are enabled, the TPM version is determined and enabled based on the highest priority condition. For example, the priority of the OS type may be the highest. The priority of the boot mode may be the second highest. The priority of the presence or absence of a hardware TPM may be the lowest.

The priorities of the conditions for automatic switching may be changed by the user.

Figure 4:
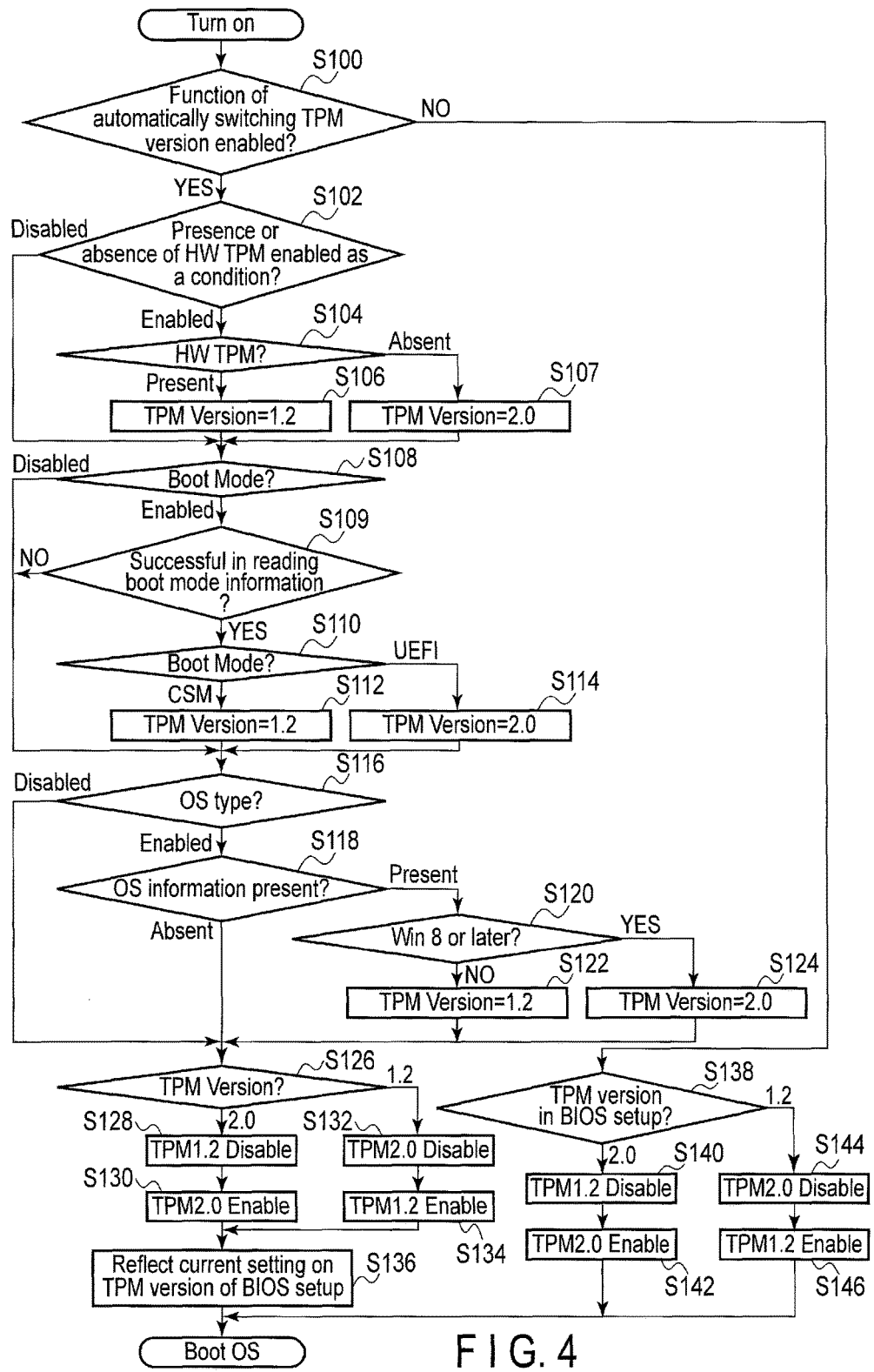
FIG. 4 is an exemplary flowchart showing the procedure of a version switching process of a trusted platform module (TPM) executed by the information processing device of the embodiment.

The flowchart of FIG. 4 shows the procedure of a TPM version switching process performed by the CPU 111 executing the instructions included in the BIOS (UEFI BIOS).

When the computer 10 is turned on, the BIOS is executed by the CPU 111. Then, it is determined whether the function of automatically switching the TPM version is enabled based on a setting value corresponding to the setting item "TPM Version Switching" (step S100).

When the function of automatically switching the TPM version is enabled (YES in step S100), it is determined whether the presence or absence of a hardware TPM (HW TPM) is enabled as a condition for automatic switching based on the setting values indicative of the conditions for automatic switching (step S102).

When the presence or absence of an HW TPM is enabled as a condition for automatic switching, it is determined whether a hardware TPM is present in the computer 10 (step S104). A process for enabling TPM 1.2 (a hardware TPM) or TPM 2.0 (a software TPM) is performed based on the result of determination indicating whether a hardware TPM is present. In this case, TPM 1.2 (a hardware TPM) or TPM 2.0 (a software TPM) may be actually enabled, or a value indicating TPM 1.2 or TPM 2.0 may be assigned to a variable indicating the TPM version to be operated. In the following explanation, it is assumed that a value indicating TPM 1.2 or TPM 2.0 is assigned to the above variable, and TPM 1.2 or TPM 2.0 is actually enabled based on the variable at the last stage of the TPM version switching process.

When a hardware TPM is present, a value indicating TPM 1.2 is assigned to the variable (step S106). When a hardware TPM is not present, a value indicating TPM 2.0 is assigned to the variable (step S107).

When the presence or absence of an HW TPM is disabled as a condition for automatic switching, steps S104, S106 and S107 are not performed.

Subsequently, it is determined whether the boot mode is enabled as a condition for automatic switching based on the setting values indicating the conditions for automatic switching (step S108).

When the boot mode is enabled as a condition for automatic switching, it is determined whether TPM 1.2 or TPM 2.0 should be enabled, giving the result of determination of the boot mode priority over the result of determination of the presence or absence of an HW TPM.

More specifically, a setting value (boot mode information) corresponding to the setting item "Boot Mode" is read from the BIOS-ROM 116. When the setting value is read successfully, it is determined whether the current boot mode is set to UEFI boot or CSM boot based on the setting value (step S110). When the current boot mode is set to CSM boot, a value indicating TPM 1.2 is assigned to the above variable (step S112). When the current boot mode is set to UEFI boot, a value indicating TPM 2.0 is assigned to the variable (step S114).

When the boot mode is disabled as a condition for automatic switching, or when the above boot mode information is failed to read, steps S110, S112 and S114 are not performed.

Subsequently, it is determined whether the OS type is enabled as a condition for automatic switching based on the setting values indicating the conditions for automatic switching (step S116).

When the OS type is enabled as a condition for automatic switching, it is determined whether TPM 1.2 or TPM 2.0 should be enabled on condition that OS information is present, giving the result of determination of the OS type priority over the result of determination of the presence or absence of an HW TPM and the result of determination of the boot mode.

More specifically, it is determined whether OS information indicating the OS which is previously booted is present (step S118). When OS information is present, it is determined whether the OS which is previously booted is the first type OS (Windows 8 or later) based on the OS information (step S120). When the OS which is previously booted is not the first type OS, a value indicating TPM 1.2 is assigned to the variable (step S122). When the OS which is previously booted is the first type OS, a value indicating TPM 2.0 is assigned to the variable (step S124).

When the OS type is disabled as a condition for automatic switching, or when OS information is not present, steps S120, S122 and S124 are not performed.

Subsequently, a process for actually enabling TPM 1.2 or TPM 2.0 is executed in accordance with the current value of the variable. Firstly, it is determined whether the variable indicates TPM 1.2 or TPM 2.0 (step S126).

When the variable indicates TPM 2.0, TPM 1.2 is disabled (step S128), and TPM 2.0 is enabled (step S130). Further, a value indicating the enabled current TPM version is reflected on the setting value of the setting item "TPM Version" (step S136). Here, since TPM 2.0 is enabled, TPM 2.0 is reflected on the setting value of the setting item "TPM Version". Step S136 allows the value of the setting item "TPM Version" displayed on the BIOS setup screen to be identical with the TPM version which is actually enabled.

When the variable indicates TPM 1.2, TPM 2.0 is disabled (step S132), and TPM 1.2 is enabled (step S134). Moreover, a value indicating the enabled current TPM version is reflected on the setting value of the setting item "TPM Version" (step S136). Here, since TPM 1.2 is enabled, TPM 1.2 is reflected on the setting value of the setting item "TPM Version". Step S136 allows the value of the setting item "TPM Version" displayed on the BIOS setup screen to be identical with the TPM version which is actually enabled.

When the function of automatically switching the TPM version is disabled (manual setting) (NO in step S100), it is determined whether the TPM version to be used is set to TPM 2.0 or TPM 1.2 based on a setting value corresponding to the setting item "TPM Version" (step S138).

When the TPM version to be used is set to TPM 2.0, TPM 1.2 is disabled (step S140), and TPM 2.0 is enabled (step S142).

When the TPM version to be used is set to TPM 1.2, TPM 2.0 is disabled (step S144), and TPM 1.2 is enabled (step S146).

In this manner, at the time of turning the computer 10 on, either TPM 1.2 or TPM 2.0 is enabled prior to booting the OS.

After either TPM 1.2 or TPM 2.0 is enabled, a process for booting the OS (CSM boot or UEFI boot) is executed in accordance with a setting value corresponding to the setting item "Boot Mode". In CSM boot, control is passed from the BIOS to the bootloader in the MBR. In UEFI boot, control is passed from the BIOS to the UEFI OS loader in the UEFI system partition.

According to the procedure of the TPM version switching process explained in FIG. 4, whether TPM 1.2 or TPM 2.0 should be enabled is automatically determined based on the enabled condition(s) for automatic switching (at least one of the OS type, the boot mode and the presence or absence of a hardware TPM).

At least one of the OS type, the boot mode and the presence or absence of a hardware TPM may be set so as to be enabled in advance as the default condition(s) for automatic switching. For example, the boot mode may be set so as to be enabled in advance as the default condition for automatic switching. Alternatively, for example, both the boot mode and the OS type may be set so as to be enabled in advance as the default conditions for automatic switching. Alternatively, both the boot mode and the presence or absence of a hardware TPM may be set so as to be enabled in advance as the default conditions for automatic switching.

Alternatively, both the OS type and the presence or absence of a hardware TPM may be set so as to be enabled in advance as the default conditions for automatic switching. Alternatively, all of the OS type, the boot mode and the presence or absence of a hardware TPM may be set so as to be enabled in advance as the default conditions for automatic switching.

As explained above, in the present embodiment, the boot mode may be used as a condition for automatic switching. In this case, whether the boot mode of the computer 10 is set to the first mode (UEFI boot) for booting the operating system from a storage device initialized by a master boot record (MBR) or the second mode (CSM boot) for booting the operating system from a storage device initialized by a GUID partition table (GPT) is determined based on the setting value indicative of the boot mode in the BIOS setup. Based on the result of determination of the boot mode, a process for enabling the first trusted platform module (for example, TPM 1.2) or the second trusted platform module (for example, TPM 2.0) is performed. Thus, a TPM version suitable for the operation environment of the computer 10 (for example, the type of OS to be booted) can operate.

Since the processing of the present embodiment can be implemented by a computer program, advantages similar to those of the present embodiment can easily be obtained by installing the computer program into a computer via a computer-readable storage medium on which the computer program is stored, and by merely executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a hardware processor;
a nonvolatile memory configured to store a system program;
a first trusted platform module; and
a second trusted platform module which is a version newer than the first trusted platform module,
wherein the system program causes the hardware processor to perform functions of:
determining whether a boot mode of the information processing device is set to a first mode or a second mode based on a setting value indicative of the boot mode, wherein the first mode is a mode for booting an operating system from a storage device initialized by a master boot record (MBR) and the second mode is a mode for booting an operating system from a storage device initialized by a GUID partition table (GPT); and
enabling the first or second trusted platform module based on a result of determination of the boot mode such that the first trusted platform module is enabled when the boot mode is the first mode, and the second trusted platform module is enabled when the boot mode is the second mode,
wherein the system program causes the hardware processor to further perform functions of:
determining whether an operating system which is previously booted is a first type operating system supporting the second trusted platform module based on information related to the operating system which is previously booted; and
enabling the first or second trusted platform module based on a result of determination of the type of the operating system which is previously booted such that the second trusted platform module is enabled when the operating system which is previously booted is the first type operating system, and the first trusted platform module is enabled when the operating system which is previously booted is not the first type operating system.

2. The information processing device of claim 1, wherein the system program causes the hardware processor to further perform a function of determining whether the first or second trusted platform module should be enabled by giving the result of determination of the type of the operating system which is previously booted priority over the result of determination of the boot mode when the information related to the operating system which is previously booted is present.

3. The information processing device of claim 1, wherein the first trusted platform module is implemented by a first hardware device, the second trusted platform module is implemented by software, and the system program causes the hardware processor to further perform functions of:

determining whether the first hardware device is present in the information processing device; and enabling the first or second trusted platform module based on a result of determination of presence or absence of the first hardware device such that the first trusted platform module is enabled when the first hardware device is present, and the second trusted platform module is enabled when the first hardware device is not present.

4. The information processing device of claim 3, wherein the system program causes the hardware processor to further perform a function of determining whether the first or second trusted platform module should be enabled by giving the result of determination of the boot mode priority over the result of determination of the presence or absence of the first hardware device when a setting value indicating the boot mode is available.

5. The information processing device of claim 1, wherein the system program causes the hardware processor to further perform functions of:

displaying a setup screen comprising a first setting item for setting a function of automatically switching a trusted platform module version so as to be enabled or disabled and a second setting item for manually setting the trusted platform module version to be used;

enabling, when a setting value of the first setting item indicates that the function for automatic switching is enabled, the first or second trusted platform module based on the result of determination of the boot mode; and enabling, when the setting value of the first setting item indicates that the function for automatic switching is disabled, the first or second trusted platform module in accordance with a setting value of the second setting item.

6. A version switching method of a trusted platform module comprising:

determining whether a boot mode of an information processing device is set to a first mode or a second mode based on a setting value indicative of the boot mode, wherein the first mode is a mode for booting an operating system from a storage device initialized by a master boot record (MBR) and the second mode is a mode for booting an operating system from a storage device initialized by a GUID partition table (GPT);

enabling a first trusted platform module or a second trusted platform module which is a version newer than the first trusted platform module based on a result of determination of the boot mode such that the first trusted platform module is enabled when the boot mode is the first mode, and the second trusted platform module is enabled when the boot mode is the second mode;

determining whether an operating system which is previously booted is a first type operating system supporting the second trusted platform module based on information related to the operating system which is previously booted; and enabling the first or second trusted platform module based on a result of determination of the type of the operating system which is previously booted such that the second trusted platform module is enabled when the operating system which is previously booted is the first type operating system, and the first trusted platform module is enabled when the operating system which is previously booted is not the first type operating system.

7. A computer-readable, non-transitory storage medium having stored thereon a computer program which is executable by a computer, the computer program controlling the computer to execute functions of:

determining whether a boot mode of the computer is set to a first mode or a second mode based on a setting value indicative of the boot mode, wherein the first mode is a mode for booting an operating system from a storage device initialized by a master boot record (MBR) and the second mode is a mode for booting an operating system from a storage device initialized by a GUID partition table (GPT);

enabling a first trusted platform module or a second trusted platform module which is a version newer than the first trusted platform module based on a result of determination of the boot mode such that the first trusted platform is enabled when the boot mode is the first mode, and the second trusted platform module is enabled when the boot mode is the second mode;

determining whether an operating system which is previously booted is a first type operating system supporting the second trusted platform module based on information related to the operating system which is previously booted; and enabling the first or second trusted platform module based on a result of determination of the type of the operating system which is previously booted such that the second trusted platform module is enabled when the operating system which is previously booted is the first type operating system, and the first trusted platform module is enabled when the operating system which is previously booted is not the first type operating system.

* * * * *